United States Patent [19]

Hidary

[11] Patent Number: 5,852,775
[45] Date of Patent: Dec. 22, 1998

[54] CELLULAR TELEPHONE ADVERTISING SYSTEM

[75] Inventor: Murray Hidary, New York, N.Y.

[73] Assignee: Earthweb, Inc., New York, N.Y.

[21] Appl. No.: 712,864

[22] Filed: Sep. 12, 1996

[51] Int. Cl.⁶ .................................................. H04Q 7/22
[52] U.S. Cl. ............................................. 455/404; 455/412
[58] Field of Search ............................. 455/4.1, 4.2, 413, 455/404, 412; 379/67, 88, 89, 45, 88.25

[56] References Cited

U.S. PATENT DOCUMENTS 4,850,007  7/1989  Marino et al. ............................ 379/67
5,283,731  2/1994  Lalonde et al. ........................... 379/88
5,448,625  9/1995  Lederman .................................. 379/88
5,515,098  5/1996  Carles .......................................... 348/8

Primary Examiner—Andrew M. Dolinar
Attorney, Agent, or Firm—Gottlieb, Rackman & Reisman, P.C.

[57] ABSTRACT

A cellular telephone system, is provided with an ad server and a memory for holding various commercial messages. The messages are either generic, or are tailored for specific demographically selected subscribers, or geographic cells. When communication is established either between a subscriber or a nonsubscriber, at least one of them gets either a generic or a specific commercial message.

19 Claims, 4 Drawing Sheets

CELLULAR TELEPHONE ADVERTISING SYSTEM

BACKGROUND OF THE INVENTION

A. Field of Invention

This invention pertains to a cellular telephone system with means for selective delivery of advertising or other promotional material to subscribers.

B. Description of the Prior Art

Cellular telephone systems have become widespread all over the world because they provide virtually instantaneous communication between almost any two points. Moreover because of technological advances, typical cellular telephones are small enough so that they are easy to carry in a person's pocket or purse. However, one disadvantage of the present systems is that they are expensive to use. The cost of cellular telephone systems is particularly high for individuals.

This problem can be overcome by providing a system which selectively delivers to cellular telephone subscribers and others communicating with the subscribers advertisement or other commercial communication as part of the cellular telephone system. It is expected that advertisers will pay the carrier for the right of providing the messages as well as the service of integrating the advertisement material with normal telephone communications thereby reducing the cost of normal services to subscribers.

OBJECTIVES AND SUMMARY OF THE INVENTION

In view of the above-named disadvantages, it is an objective of the present invention to provide a cellular telephone system which provides automatic selective commercial advertisement to various subscribers.

It is a further objective to provide a system which is easily integrated with the existing system so that there is a minimal amount of additional equipment, or modifications required.

Yet another objective is to provide a system which provides commercial advertisement to targeted audiences in an efficient and reliable manner, yet which does not interfere with the normal, and especially emergency operation of the cellular telephone system.

Accordingly, a system constructed in accordance with this system consists of a standard cellular telephone service composed of cells extending over preselected geographic areas, a cell transceiver in each cell for communicating with cellular telephones within the cell and a central station or MTSO which provides communication between the cell transceivers and a standard hard wired telephone system. Importantly, the central office includes a memory bank holding a list of subscribers together with the corresponding security codes or NAMs. The central office further includes a second memory bank which contains specific data for each of the cells which should be of interest to a subscriber, and/or demographic data for each subscriber.

When a subscriber initiates a call to a third party, either before, or while connection is being made, the subscriber hears a message of about 1–30 seconds. At the end of the message, the connection is completed and the subscriber hears a ring or a busy tone. The message could be of a general nature related to the cell site, or it could be detected from a set of messages based on information about the subscriber, such as age, sex, income, hobbies, profession, etc.

If a first cellular subscriber calls a second cellular subscriber, both subscribers may receive messages. Finally, when a cellular subscriber calls a hardwired subscriber, the hardwired subscriber may also get a message.

DETAILED DESCRIPTION OF THE INVENTION

Figure 1:
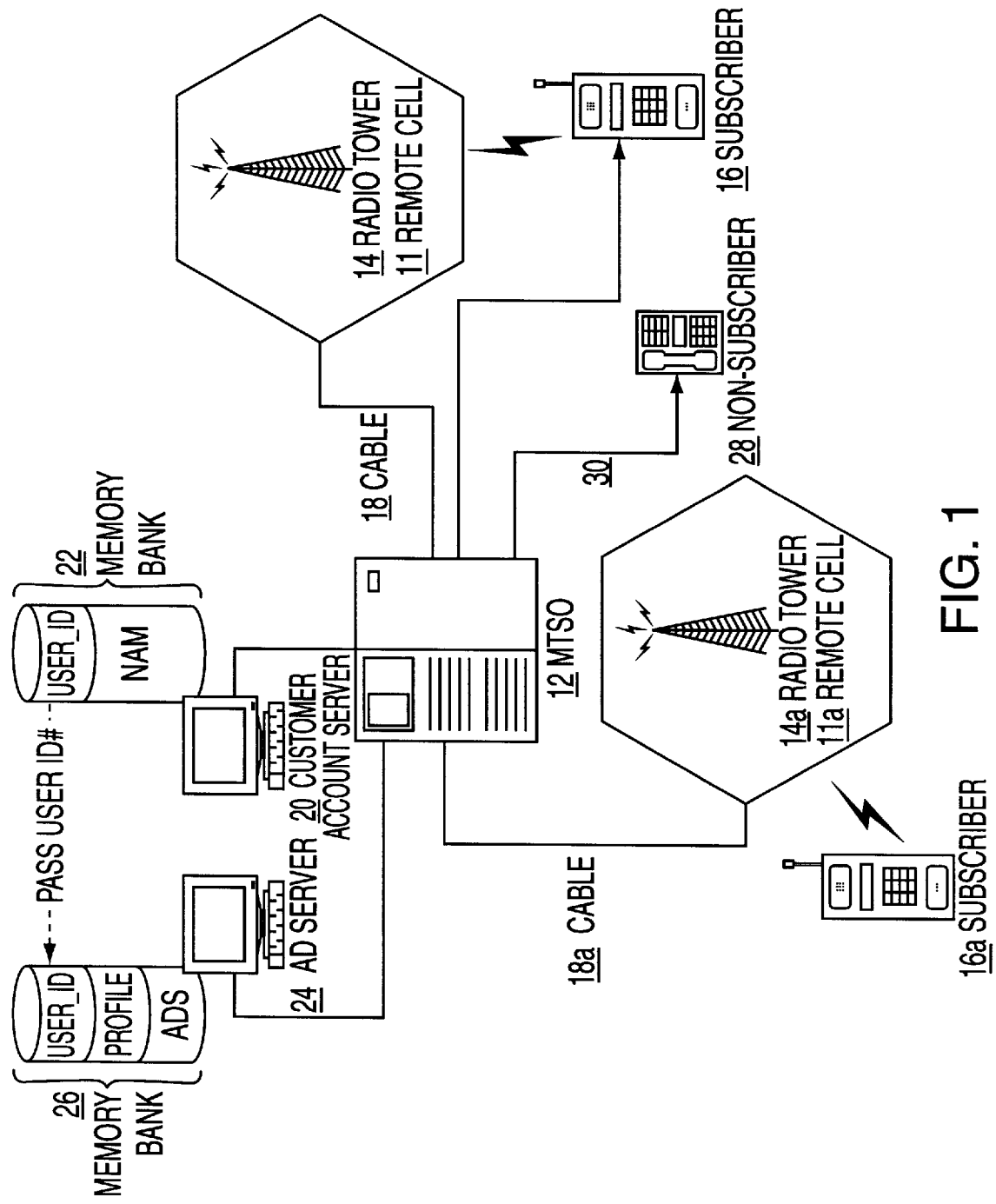
FIG. 1 shows a block diagram of a cellular telephone system constructed in accordance with this invention.

Referring now to FIG. 1, a cellular telephone system constructed in accordance with this invention includes a central station 12 commonly referred to as a MTSO and a plurality of remote cells, such as remote cell 11. Cell 11 corresponds to a geographic area and includes a radio tower 14. Radio tower 14 includes a transceiver which monitors the cell 11 for rf transmissions from subscribers such as subscriber 16, as shall be described in more detail below.

Tower 14 communicates with central station 12 through a cable 18. Associated with the central station is a customer account server 20 having a memory bank 22 holding all the information descriptive of various subscribers, including their user identification, corresponding NAM and so on. Also associated with central station 12 is an ad server 24 used to manage commercial advertisement and other similar commercial messages as described below. The server 24 is provided with a memory bank 26 used to store the commercial messages, as well as a table of subscribers served by the station 12 and a corresponding profile for each subscriber.

Figure 2:
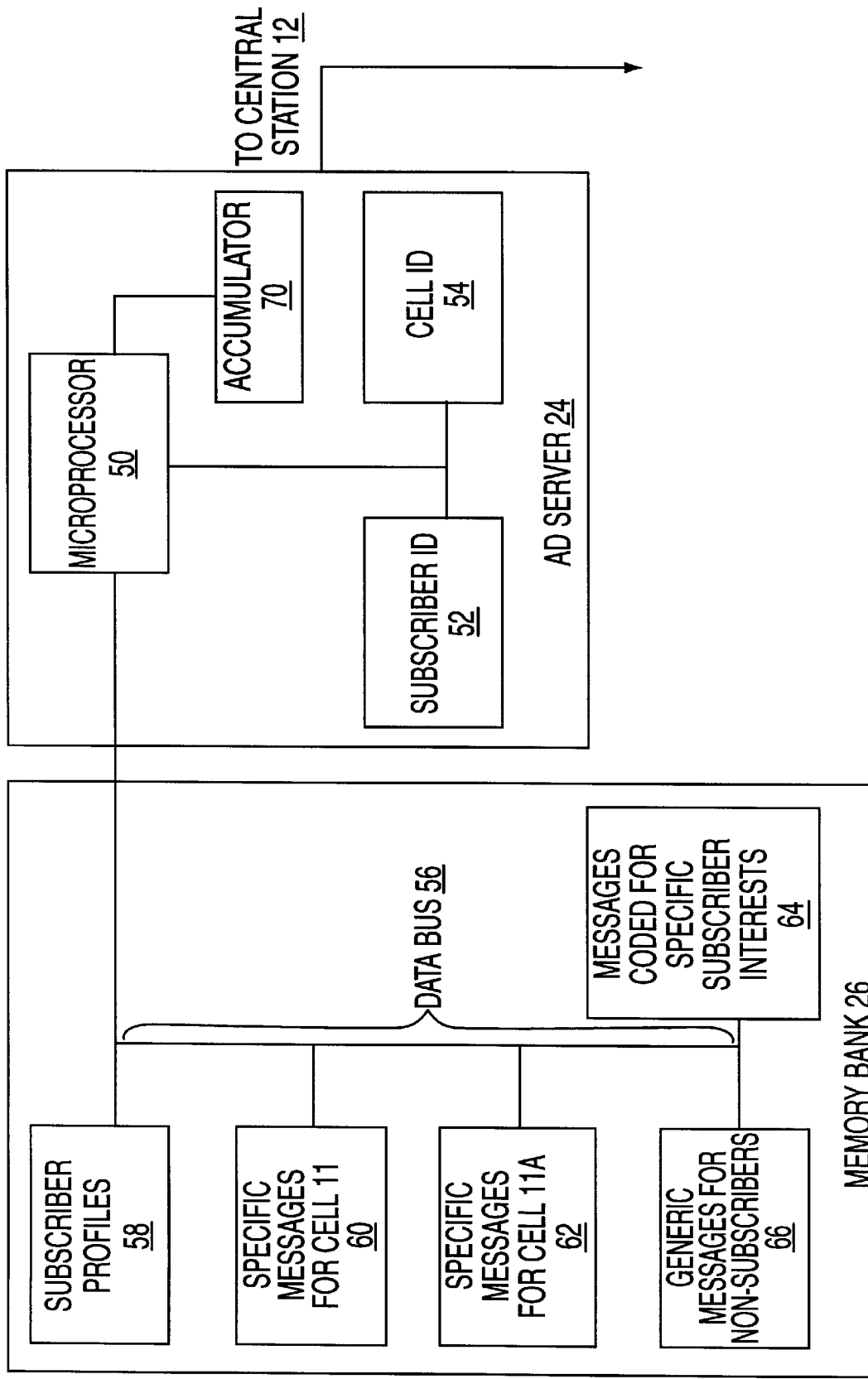
FIG. 2 details of the ad server and the message memory bank of FIG. 1.

As shown in more detail in FIG. 2, ad server 24 includes a microprocessor 50, a subscriber identifier 52 and a cell identifier 54. Microprocessor 50 communicates with the memory bank 26 through a data bus 56. The message memory bank includes the following memories: memory 58 for subscriber profiles, memory 60 for specific messages related to cell 11, memory 62, for specific messages for a cell 11A (discussed below), memory 64 for messages correlated with specific subscriber profile items and memory 66 for generic messages. It should be understood that this listing is exemplary only, and that the information may be arranged in other categories. In addition, not all these memories are needed for all the embodiments, as discussed more fully below.

Figure 3:
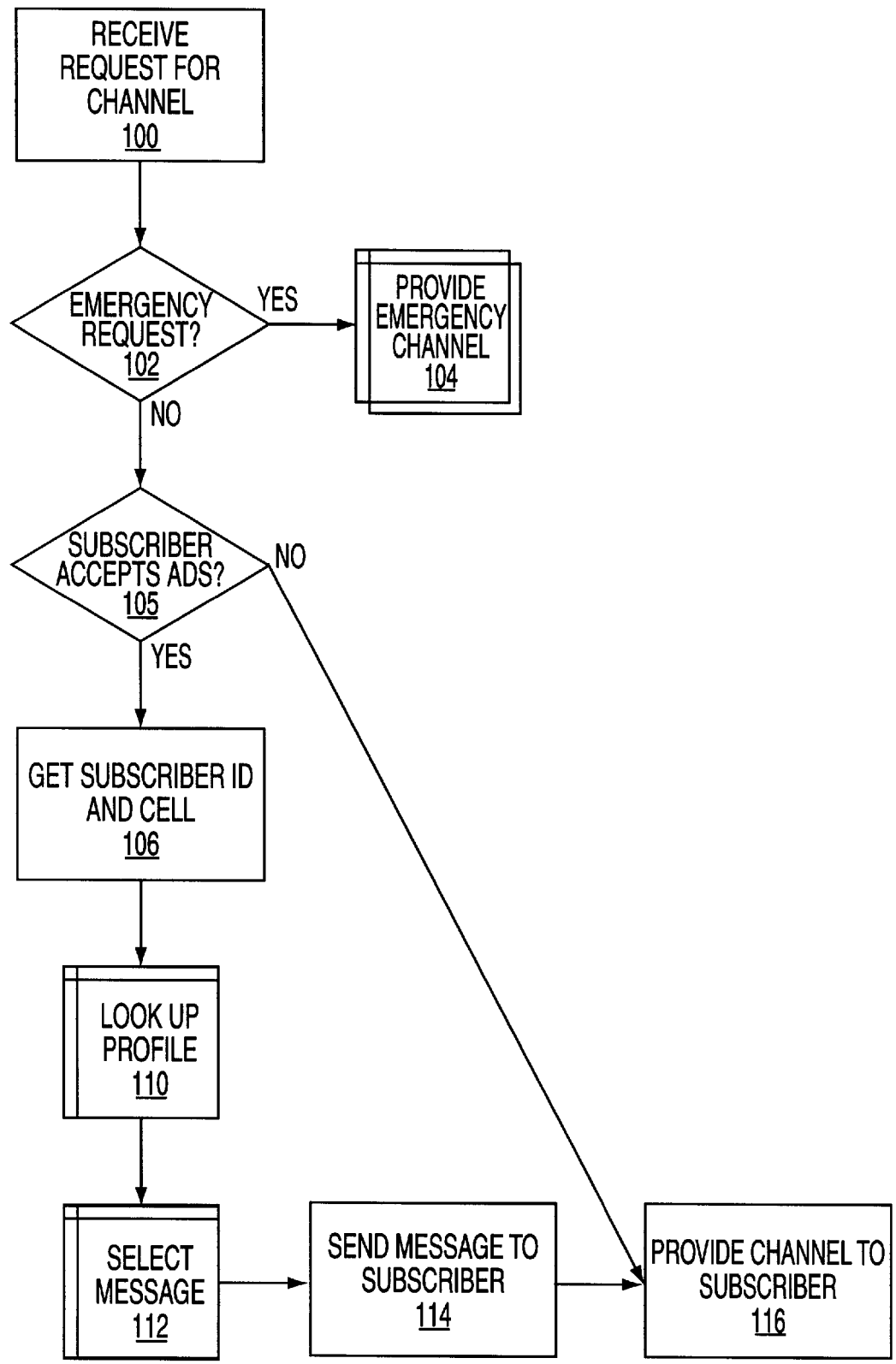
FIG. 3 shows a flow chart for a first embodiment.

In order to provide an understanding of how the system of FIG. 1 operates, reference is now made to the flow chart of FIG. 3. This flow chart describes a scenario where a subscriber 16 requests communication with a standard non-subscriber 28. For this purpose, the subscriber requests an open channel together with the telephone number of non-subscriber 28 through radio tower 14. Tower 14 transmits this information to station 12. In step 100 station 12 receives the request for an open channel. In step 102 the station determines whether the request is for an emergency channel (i.e., it is a '911' call). If the request is for an emergency channel, the station bypasses the advertisement provision and provides an emergency channel to the subscriber (step 104).

In step 105 the station 12 determines if the subscriber 16 is ready to receive commercial messages. For example, the station 12 may send to subscriber 16 an oral message instructing the subscriber 16 to press a preselected key (such as '#') if he does not wish to receive messages with this call.

If the subscriber 16 indicates (either positively or through inaction) that he wishes to receive a message, an appropriate commercial message is retrieved as follows.

The ad server 24 first determines the identity of the subscriber using subscriber identifier 52 (step 106). The ad server 24 further determines the location of the subscriber (in this case, cell 11) using subscriber locator 54. The identifiers 52 and 54 are shown as part of the ad server 24 for the sake of convenience, it being understood that these elements may be part of the master station as well. Moreover, while these elements are shown as discrete elements for the sake of clarity, preferably they are implemented as software. The microprocessor 50 uses this information to look up in data bank 26 the profile of subscriber 16 (step 110). From the profile the ad server then has to select an appropriate message from the messages stored in memory bank 26.

Previously the subscriber 16 has been requested to provide information about himself which may be useful to target specific advertising for him. This information may include the age, sex, income, hobbies, preferences, profession and other similar information. All this subscriber specific information is stored in memory 58.

In step 112 the ad server selects a message appropriate for the subscriber 16 based on the profile. These messages are stored in memory 60 or 64. In step 114 the message is sent by ad server 24 to station 12 which in response sends it onto the subscriber 16.

While this is going on the station 12 also takes the necessary steps to establish a standard telephone connection 30 to the nonsubscriber 28. In step 116 after the commercial message to subscriber 16 is completed, the connection 30 is completed and the subscriber 16 either hears a standard ring for nonsubscriber 28 or hears a busy signal, dependent on the state of the non-subscriber's equipment. The remainder of the operation of the system is the same as with any other standard cellular telephone system.

The messages stored in memory bank 26 and delivered to the subscriber may be any one of a plurality of messages dependent on the subscriber's profile and location of cell 11. For example, if the subscriber has indicated that he likes to go to the movies, the message delivered during step 114 from memory 60 may be a brief advertisement for a recently released movie and where that move is playing in, or close to cell 11. If the subscriber indicates that he is an avid sports fan, the message from memory 64 may indicate when the subscriber's favorite team plays in his area. If his profile indicates that he has a four year old car, the message may be an advertisement from a local car dealer for a new car.

Figure 4:
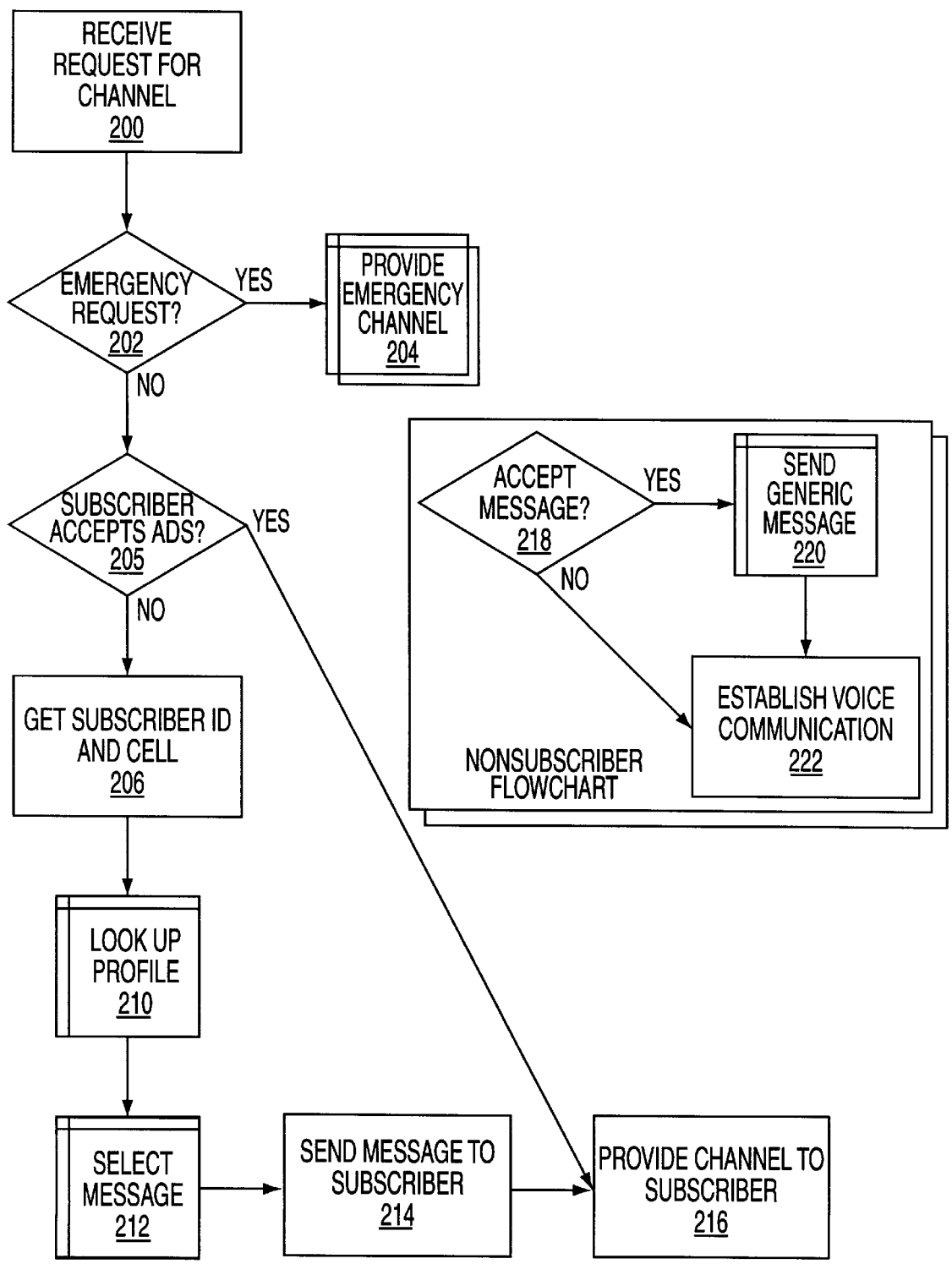
FIG. 4 shows a flow chart for another embodiment.

An alternate embodiment of the invention is shown in FIG. 4. This Figure describes how messages may be delivered not only to the subscriber 16, but also to the nonsubscriber 28. For this purpose, information bank 26, and more specifically memory 66, contains generic messages of general interest, since the profile of the nonsubscriber is unknown. Steps 200–216 are identical to steps 100–116 in FIG. 2. However after connection is established (step 216) before verbal communication between the subscriber and the non-subscriber takes place, the non-subscriber receives a brief generic message from memory 66.

Preferably at the beginning of the generic message, the non-subscriber 28 may initiate a command indicating that he does not want to receive any generic messages. This command may be initiated by depressing one or more keys on the nonsubscriber's instrument in a particular sequence. In step 218 a test is performed to see if the nonsubscriber accepts generic messages. If he does then in step 220 a generic message is delivered. After the generic massage, in step 222 voice communication is established.

In step 218 if the nonsubscriber does not accept messages than step 220 is skipped.

A similar option may be provided to allow the subscriber to reject messages as well, either in the embodiment of FIG. 2 or 3.

In the previous descriptions, the calls are initiated by the subscriber 16. In an alternate embodiment the calls are initiated by the nonsubscriber 28, with the same message(s) being delivered as described before.

In yet another embodiment of the invention, subscriber 16 initiates a call to a second subscriber 16A. Subscriber 16A is physically located in a second cell 11A having a tower 14A and communication with central station 12 via a connection 18A. The manner of establishing communication between subscribers 16 and 16A is well known and need not be repeated here. The main difference between this latter embodiment is that subscriber 16A receives messages from memory 62. Memory bank 26 also includes a profile of subscriber 16A and therefore when subscriber 16A receives a message (step 220) this message may be specifically selected from memory 62 based on the profile of subscriber 16A and cell 11A.

In yet another embodiment of the invention, subscriber 16 may be actively seeking information from the information bank 26. For example, subscriber 16 may not be familiar with cell 11 and may require information regarding a convenient restaurant, gas station, etc. For this purpose, subscriber 16 sends a code to central station 12 to indicate that he wants to access the memory bank 26. The ad server 24 again identifies the subscriber 16 and his cell 11 provides the subscriber with a list of messages that are available from the memory 60. The subscriber than selects one of these options and receives the corresponding message or messages.

Reference to FIG. 2, the central station 12 also may include an accumulator 20 for accumulating the number of ads (or other similar indicia) that a particular subscriber 16 has received and heard. At regular times, this information is sent to the customer accounts server 20 which generates the bill to each customer. The server 20 can then take into account the number of ads heard by a subscriber and adjust the subscriber's bill accordingly. Similar adjustments can be made for ads heard by nonsubscribers during calls initiated by the subscriber 16.

Although the invention has been described with reference to several particular embodiments, it is to be understood that these embodiments are merely illustrative of the application of the principles of the invention. Accordingly, the embodiments described in particular should be considered exemplary, not limiting, with respect to the following claims.

I claim:

1. A cellular telephone system comprising:
   a central station;
   a plurality of cells, each cell corresponding to a geographic area and having a cell transceiver in communication with said central station; and
   a plurality of mobile telephones, each telephone being associated with a subscriber;
   wherein said central station includes:
   (a) first connectors for exchanging information with said telephones through said cell transceivers;
   (b) second connectors for connecting said central station to a standard hardwired telephone system;

(c) a commercial message center for providing a commercial message to a specific mobile telephone when said mobile telephone establishes communication with said central station, said commercial message being unrelated to the operation of said mobile telephone; and (d) a selector receiving commands from one of said subscribers indicative of whether said subscriber desires to receive commercial messages, said selector providing said commercial message to said subscriber if said one subscriber has indicated that he accepts commercial messages;

wherein said selector includes an emergency sensor for sensing an emergency command from said one subscriber, said selector connecting said one subscriber to a channel of communication in the presence of said emergency command.

2. The system of claim 1 wherein said mobile telephone includes means for generating a request for initiating a call to a nonsubscriber, and wherein said commercial message is provided in response to said request.

3. The system of claim 1 wherein said mobile telephone includes means for generating a request for information and wherein said commercial message is generated in response to said request.

4. The system of claim 1 wherein said mobile telephone includes means for generating a request for connection to a nonsubscriber and wherein said message center generates a nonsubscriber message to said nonsubscriber in response to said request.

5. A commercial message center for a cellular telephone system, said telephone system being formed of a central station and a plurality of cells, each cell corresponding having a transceiver in communication with said central station and a plurality of subscriber telephones, each telephone being located in one of said cells, said center comprising:

a receiver for receiving a communication request from one of said subscriber telephones;

a first identifier for identifying the subscriber of said one subscriber telephone from said communication request and the cell from which said one subscriber is calling;

a memory bank holding a plurality of messages;

a correlator for correlating one of said messages from said memory bank with data associated with said one subscriber based on said cell; and a transmitter for transmitting said message to said one subscriber.

6. The center of claim 5 wherein said subscriber telephone includes a request means for generating said communication request, said telephone system being responsive to said communication request to connect said subscriber telephone to another telephone device.

7. The center of claim 6 wherein said other telephone device is a subscriber telephone and said memory bank includes a first memory holding messages for said subscriber telephone and a second memory holding messages for said other telephone device.

8. The center of claim 5 wherein said memory bank includes a profile memory holding information related to profiles of all subscribers.

9. The center of claim 5 wherein said memory includes a generic memory holding generic messages.

10. The center of claim 5 wherein said memory bank includes a cell memory holding messages related to one of said cells.

11. The center of claim 5 further comprising a second transmitter for transmitting a second message to a device other said subscriber telephone.

12. The center of claim 5 further comprising an accumulator for accumulating a number of messages received by said subscriber.

13. A method of providing advertising information to subscribers of a cellular telephone system comprising the step of: storing a plurality of commercial messages into a memory bank, said commercial messages being unrelated to the operation of said cellular telephone system;

sensing a request for communication from a subscriber telephone located in a cell of said system and said cell;

determining the identity of said subscriber from said request;

retrieving one commercial message from said information and based on said identity and the location of said subscriber from said cell; and transmitting said one commercial message to said subscriber.

14. The method of claim 13 wherein said request for communication identifies another telephone device, further comprising sending a second commercial message to said another telephone device.

15. The method of claim 13 wherein said step of sensing includes sensing if said subscriber is ready to accept a commercial message.

16. The method of 13 further comprising accumulating the number of commercial messages received by a subscriber.

17. The method of claim 16 further comprising the step of crediting said subscriber with said number of commercial messages.

18. A cellular telephone system comprising:

a central station;

a plurality of cells, each cell corresponding to a geographic area and having a cell transceiver in communication with said central station; and a plurality of mobile telephones, each telephone being associated with a subscriber;

wherein said central station includes:

(a) first connectors for exchanging information with said telephones through said cell transceivers;

(b) second connectors for connecting said central station to a standard hardwired telephone system;

(c) a detector for detecting a physical location of a particular subscriber; and (d) a commercial message center for providing a commercial message to a specific mobile telephone based on said location when said mobile telephone establishes communication with said central station, said commercial message being unrelated to the operation of said mobile telephone.

19. The system of claim 18 wherein said detector includes a cell identifier for identifying the cell of said subscriber, wherein said commercial messages is selected based on said cell.

* * * * *